United States Patent [19]

Davis

[11] Patent Number: 5,370,097

[45] Date of Patent: Dec. 6, 1994

[54] COMBINED DIESEL AND NATURAL GAS ENGINE FUEL CONTROL SYSTEM AND METHOD OF USING SUCH

[75] Inventor: Frank J. Davis, Riverdale, Ga.

[73] Assignee: Davis Family Trust, Atlanta, Ga.

[21] Appl. No.: 35,199

[22] Filed: Mar. 22, 1993

[51] Int. Cl.$^5$ .............................................. F02M 21/02
[52] U.S. Cl. ............................... 123/526; 123/27 GE
[58] Field of Search ................... 123/575, 526, 27 GE, 123/525, 198 D, 198 DB, 357

[56] References Cited

U.S. PATENT DOCUMENTS

| | | | |
|---|---|---|---|
| 4,278,064 | 7/1981 | Regueiro | 123/526 |
| 4,454,783 | 6/1984 | Sierk et al. | 123/198 DB |
| 4,463,734 | 8/1984 | Akeroyd | 123/525 |
| 4,505,249 | 3/1985 | Young | 123/527 |
| 4,512,307 | 9/1983 | Höfer | 123/198 DB |
| 4,517,831 | 5/1985 | Hirano | 123/198 DB |
| 4,520,766 | 6/1985 | Akeroyd | 123/27 |
| 4,520,780 | 6/1985 | Ito et al. | 123/198 DB |
| 4,603,674 | 8/1986 | Tanaka | 123/27 GE |
| 4,641,625 | 2/1987 | Smith | 123/27 GE |
| 4,708,094 | 11/1987 | Helmich et al. | 123/526 |
| 4,817,568 | 4/1989 | Bedford | 123/525 |
| 4,823,751 | 4/1989 | Pfalzgraf et al. | 123/198 DB |
| 4,829,957 | 5/1989 | Garretson et al. | 123/27 |
| 4,831,993 | 5/1989 | Kelgard | 123/525 |
| 4,955,326 | 9/1990 | Helmich | 123/27 GE |
| 5,083,547 | 1/1992 | Davis | 123/527 |
| 5,092,305 | 3/1992 | King | 123/27 GE |
| 5,103,795 | 4/1992 | Davis | 123/527 |
| 5,136,986 | 8/1992 | Jensen | 123/27 GE |

FOREIGN PATENT DOCUMENTS

| | | | |
|---|---|---|---|
| 0225477 | 7/1985 | Germany | 123/526 |
| 0168036 | 10/1982 | Japan | 123/525 |

Primary Examiner—E. Rollins Cross
Assistant Examiner—Erick Solis
Attorney, Agent, or Firm—Kennedy & Kennedy

[57] ABSTRACT

A dual fuel control system (10) for use with an internal combustion engine (11) is disclosed which controls the flow of liquid fuel alone or in combination with a gaseous fuel. The system has a stored supply of gaseous fuel and a fuel metering actuator (22) which regulates the flow of the gaseous fuel to the engine. The system also has a stored supply of liquid fuel and a fuel control actuator (47) which regulates the flow of diesel fuel through the movement of the shutoff valve (31) of a diesel fuel pump (28). A controller (45) controls the actuation of the actuators in response to signals received from an accelerator sensor (37), an R.P.M. sensor (45) and an exhaust temperature sensor (41).

2 Claims, 3 Drawing Sheets

COMBINED DIESEL AND NATURAL GAS ENGINE FUEL CONTROL SYSTEM AND METHOD OF USING SUCH

TECHNICAL FIELD

This invention relates to fuel control systems and methods for using such for internal combustion engines which may operate on a combination of two fuels.

BACKGROUND OF THE INVENTION

The air pollution problems inherent in the operation of gasoline fueled and diesel oil fueled internal combustion engines are well known. For this reason various emission control devices are presently in use, and indeed are required by federal regulations, to reduce the amount of pollutants discharged into the atmosphere by internal combustion engines. These emission control devices, however, only remove a portion of the pollutants and are subject to deterioration with the passage of time. Also, they often hinder engines from operating at peak efficiencies.

Natural gas is also sometimes used as a fuel for internal combustion engines. It has the capability of producing less combustion pollutants and decreasing engine operating costs without complex emission control devices. Obviously, its use would also reduce the rate of world fossil fuel consumption.

As the transportation infrastructure of today in the United States does not include large numbers of widely disbursed retail suppliers of natural gas for vehicles, it is not practical to produce vehicles that are fueled solely by gaseous fuels like natural gas due to range limitations. To evolve towards such it is more practical to equip vehicles with a supply of both a liquid fuel such as gasoline or diesel fuel and an auxiliary supply of gaseous fuel such as natural gas. To do that efficiently it is essential that as little retrofitting be done as possible to existing fuel intake systems and configurations.

Various systems have been developed for mixing gaseous fuels with liquid fuels. For example, systems have been designed which entrain gaseous fuel through a gas metering valve into air supplied to the air inlet manifold of a diesel engine. This combination of air and fuel is then mixed with the diesel fuel prior to combustion. Exemplary of this type of system is that shown in U.S. Pat. No. 4,463,734. Since these systems control the flow of gaseous fuel by the volume of air entering the engine, there is a direct and constant gaseous fuel to diesel fuel ratio. However, because different load conditions can occur at various engine speeds, this type of system does not always provide a mixture which results in maximum efficiency.

It thus is seen that a system for controlling the flow of gaseous fuel and the flow of liquid fuel into an internal combustion engine to provide the maximum efficiency and output has remained an elusive goal. Accordingly, it is to the provision of such that the present invention is primarily directed.

SUMMARY OF THE INVENTION

In a preferred form of the invention, a dual fuel control system for use with an internal combustion engine having a throttle is provided having a liquid fuel metering means for metering the flow of liquid fuel, air/fuel mixer means for mixing liquid fuel metered to the engine with air, and gaseous fuel metering means for metering the flow of gaseous fuel to the engine. The system also has engine speed sensing means for sensing the speed of the engine, engine throttle position sensing means for sensing the position of the throttle, and control means for controlling the liquid fuel metering means and the gaseous fuel metering means in response to comparisons of the sensed engine speeds with sensed throttle positions in accordance with predetermined metering settings for given engine speeds.

In another preferred form of the invention, a method of controlling the flow of a gaseous fuel and the flow of diesel fuel into a diesel engine comprises the steps of continuously sensing actual engine speeds and commanded engine speeds and metering the flow of gaseous fuel and the flow of diesel fuel into the engine in proportions relative to sensed differences between the actual engine speeds and commanded engine speeds.

DETAILED DESCRIPTION

Figure 1:
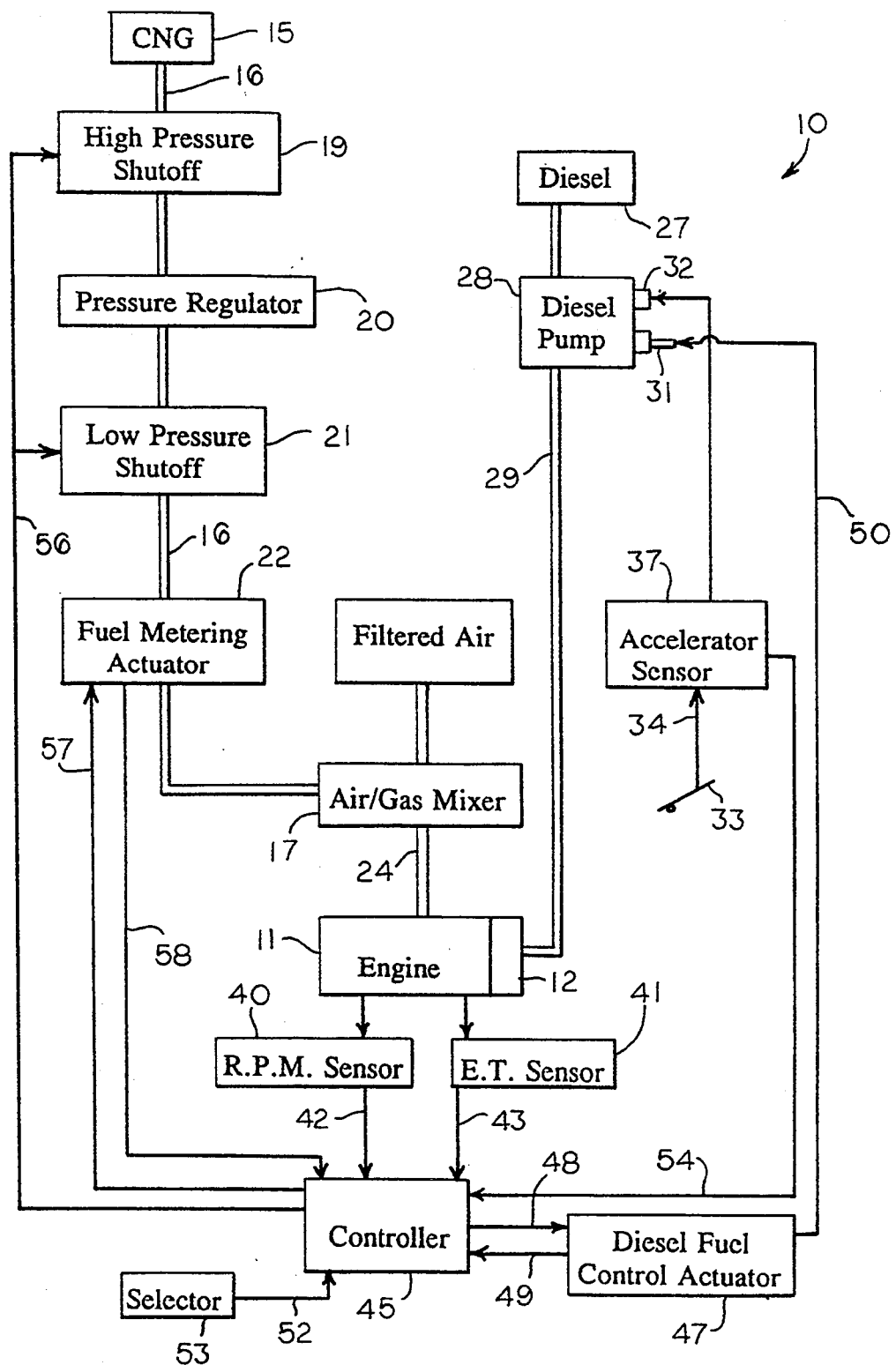
FIG. 1 is a schematic diagram of a system embodying principles of the present invention.

With reference next to the drawing, there is shown a combined liquid fuel and gaseous fuel control system 10 for use in supplying liquid fuel alone or in combination with a gaseous fuel to an internal combustion engine 11 having fuel injectors 12. Fuel injectors 12 are pump-like devices which inject fuel directly into the cylinders of the engine. The liquid fuel is hereinafter referred to as diesel fuel while the gaseous fuel is hereinafter referred to as natural gas. However, it should be understood that while it is the preferred embodiment which uses gaseous fuel such as natural gas or propane, a non-gaseous fuel such as liquid natural gas may also be utilized.

The system 10 has a high pressure gas storage tank 15 which supplies compressed natural gas (CNG) through a conduit 16 to an air/gas mixer 17 mounted to induce natural gas into an airstream entering the air intake of the engine 11. The air/gas mixer 17 may be a model SP4D of Combustion Lab's Inc. of Riverdale, Ga. A high pressure shutoff valve 19, a pressure regulator 20, a low pressure shutoff valve 21 and a fuel metering actuator 22 are coupled in series to the conduit 16 between the tank 15 and the mixer 17 to control the flow of the natural gas. The pressure regulator 20 reduces the pressure of the natural gas to a selected pressure, depending upon the type and size of engine used with the system 10. The fuel metering actuator 22 may be a model DYNK 10322-800 of Barber Colman Company of Loves Park, Ill. Filtered air from ambience is supplied to the mixer 17 through a conduit 24.

The system 10 also has a diesel fuel storage tank 27 coupled to a fuel pump 28 which supplies diesel fuel through a conduit 29 to the engine fuel injectors 12. As fuel pump 28 is driven by the engine, its output is in direct relationship to the speed of the engine. The fuel pump 28 has an unshown mechanical governor, a shutoff lever 31 and a throttle 32. The shutoff lever 31 is used in an unconventional manner so as to limit the flow of diesel fuel pumped by pump 28 just as does the throttle 32. The effective use of two throttles is employed to prevent diesel fuel from entering the engine when the engine is not operating. The throttle 32 is coupled to an accelerator pedal 33 by a movable cable 34. An accelerator sensor 37 is employed to sense the position of the manual accelerator pedal 33 and thereby the throttle 32. Tank 27, pump 28, conduit 29, throttle 32, shutoff lever 31, accelerator pedal 33 and cable 31 are, per se, standard equipment on automobiles having diesel engines.

An engine speed or R.P.M. sensor 40 and an exhaust temperature sensor 41 are coupled with the engine 11 and with a controller 45 by means of signal lines 42 and 43 respectively. The controller 45 is coupled to a diesel fuel control actuator 47 by signal output line 48 and a feedback line 49. The diesel fuel control actuator 47 is in turn mechanically coupled to the shutoff lever 31 by a cable 50. A bi-positional fuel selector 53 is provided that is coupled to the controller 45 by a signal line 52. The controller 45 is also coupled to both the shutoff valves 19 and 21 by control line 56, to the fuel metering actuator 22 by a control line 57 and by feedback line 58, and finally with the accelerator sensor 37 by a line 54.

INITIALIZING SYSTEM

To initially set the system the selector 53 is positioned "off" so that the engine operates on diesel fuel only. The engine is then operated with the fuel pump shutoff lever 31 fully opened and with the throttle 32 fully opened by actuator 47 so as to bring the engine to its maximum engine speed. A load is then placed upon the engine, as with a conventional dynamometer, to reduce the engine speed by a predetermined incremental amount, typically about 200 r.p.m. The engine's torque, horsepower and exhaust temperature is next determined by the dynamometer and stored within the memory of the controller 45. The engine is incrementally lugged down by the predetermined increment until it ceases to operate due to the load on the engine. At each incremental engine speed the dynamometer determines the resultant maximum engine torque, horsepower and exhaust temperature which is stored in the controller memory. This process is commonly referred to as "mapping" an engine.

Next, the selector 53 is positioned "on" so that the engine operates on both diesel fuel and natural gas. The engine is brought to idle with the shutoff lever 31 fully opened. The shutoff lever is then slowly closed by the action of actuator 47 so as to restrict the flow of diesel fuel therethrough while simultaneously the action of fuel metering actuator 22 increases the flow of natural gas therethrough to compensate for the reduction in diesel fuel. The actuators 22 and 47 are moved in this manner until the engine speed cannot be maintained due to a below minimal quantity of diesel fuel for combustion. This minimal amount of diesel fuel is commonly referred to as the "pilot fuel". The position of the actuator 47 and the engine speed are stored in the controller memory.

The shutoff lever 31 is then returned to a fully opened position and the throttle 32 is moved to a position which increases the engine speed, by the predetermined incremental amount, to the next engine speed which was previously mapped. The actuators 22 and 47 are again moved, as previously discussed, to determine and store the pilot fuel position of the actuator 47 for this particular engine speed. This process is repeated along the entire range of engine speeds at each previously stored engine speed. It has been found that at a minimum the pilot fuel amounts to approximately 5% of the total quantity of fuels.

OPERATION

With the controller 45 preprogrammed with a mapping of the engine's torque and horsepower for each engine speed, the controller regulates the flows of diesel fuel and natural gas in a manner which does not surpass the mapped conditions so as to overpower the engine. In other words, the combination of the two fuels does not produce an engine torque or horsepower greater than that produced by the engine conventionally operating on diesel fuel only. With the ignition of the engine 11 turned off the natural gas shutoff valves 19 and 21 and the diesel pump shutoff lever 31 are closed so that neither natural gas nor diesel fuel may enter the engine.

To start and operate the engine 11 solely on diesel fuel the selector 53 is positioned off. With the selector in this position the shutoff valves 19 and 21 remain closed so as to prevent natural gas from entering the engine. As the ignition system of the engine is activated the shutoff lever 31 is fully opened so that diesel pump 28 may force diesel fuel through conduit 29 into the injectors 12 of the engine. The flow rate of the diesel fuel supplied to the engine is conventionally determined by the mechanical governor and the position of the throttle 32. Air used in combination with the diesel fuel enters the engine through the air/gas mixer 17.

To start and operate the engine with the fuel system 10 in a dual fuel mode the selector 53 is selectively positioned on, thereby energizing controller 45. While starting the engine it is undesirable to have natural gas entering it, as this may cause the engine to "lock up" due to the pressure within the cylinders. Therefore, should the R.P.M. sensor 40 indicate that the engine is not operating above a preselected minimum speed the controller 45 signals the shutoff valves 19 and 21 to remain closed. Once the engine is operating above the preselected minimum speed, the controller 45 energizes the diesel fuel control actuator 47 and opens shutoff valves 19 and 21 to allow natural gas through the pressure regulator 20 and metering actuator 22.

The quantity of each fuel supplied to the engine is determined by the controller 45 which does so by regulating the flow of natural gas through the fuel metering actuator 22 and the flow of diesel fuel from pump 28, which is determined by the selective positioning of its throttle 32 and shutoff lever 31. The controller regulates the flows primarily in response to information provided by the R.P.M. sensor 40 and the accelerator sensor 37.

Figure 2:
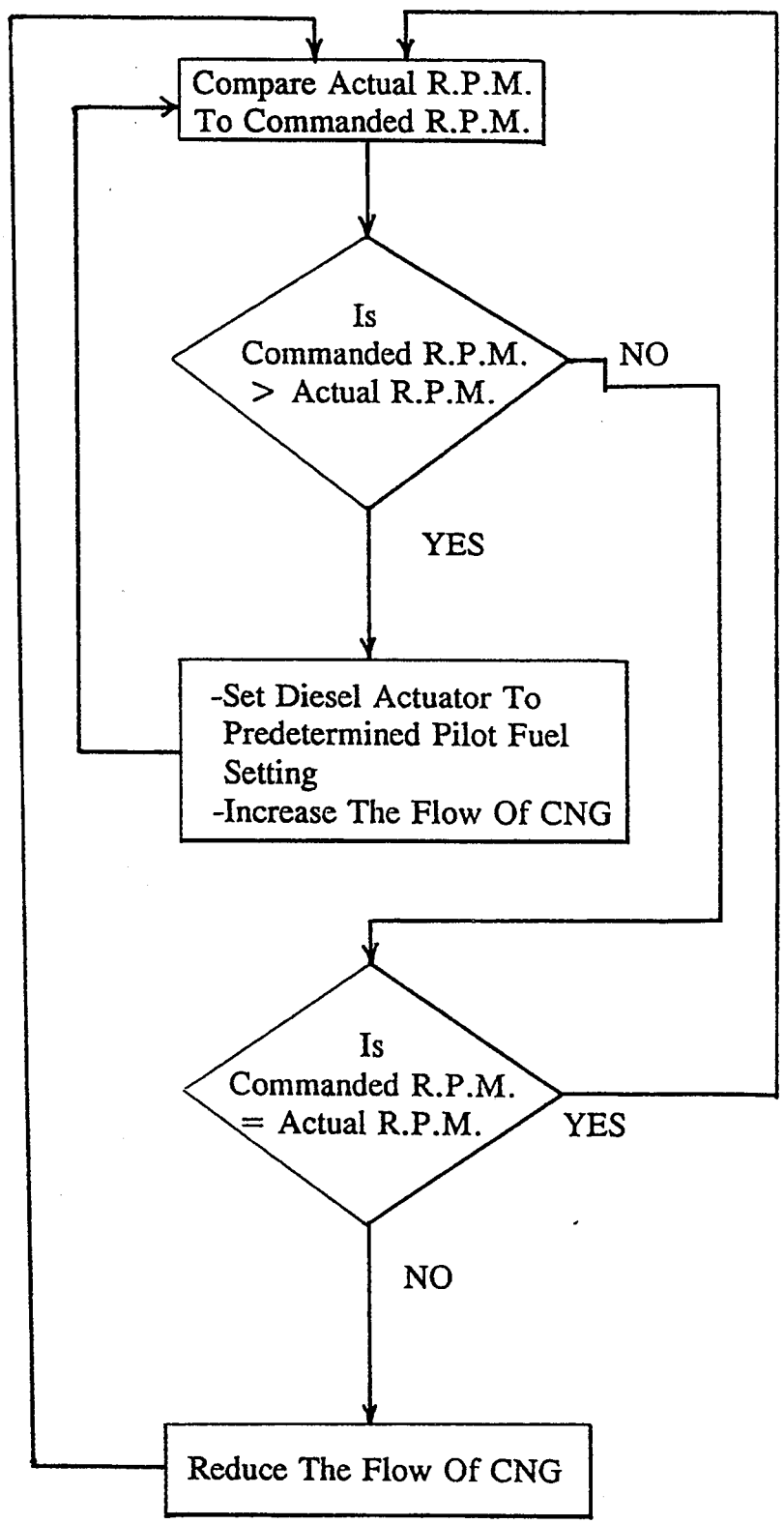
FIG. 2 is a flow diagram by which the controller of the system of FIG. 1 regulates the flow of each fuel.
Figure 3:
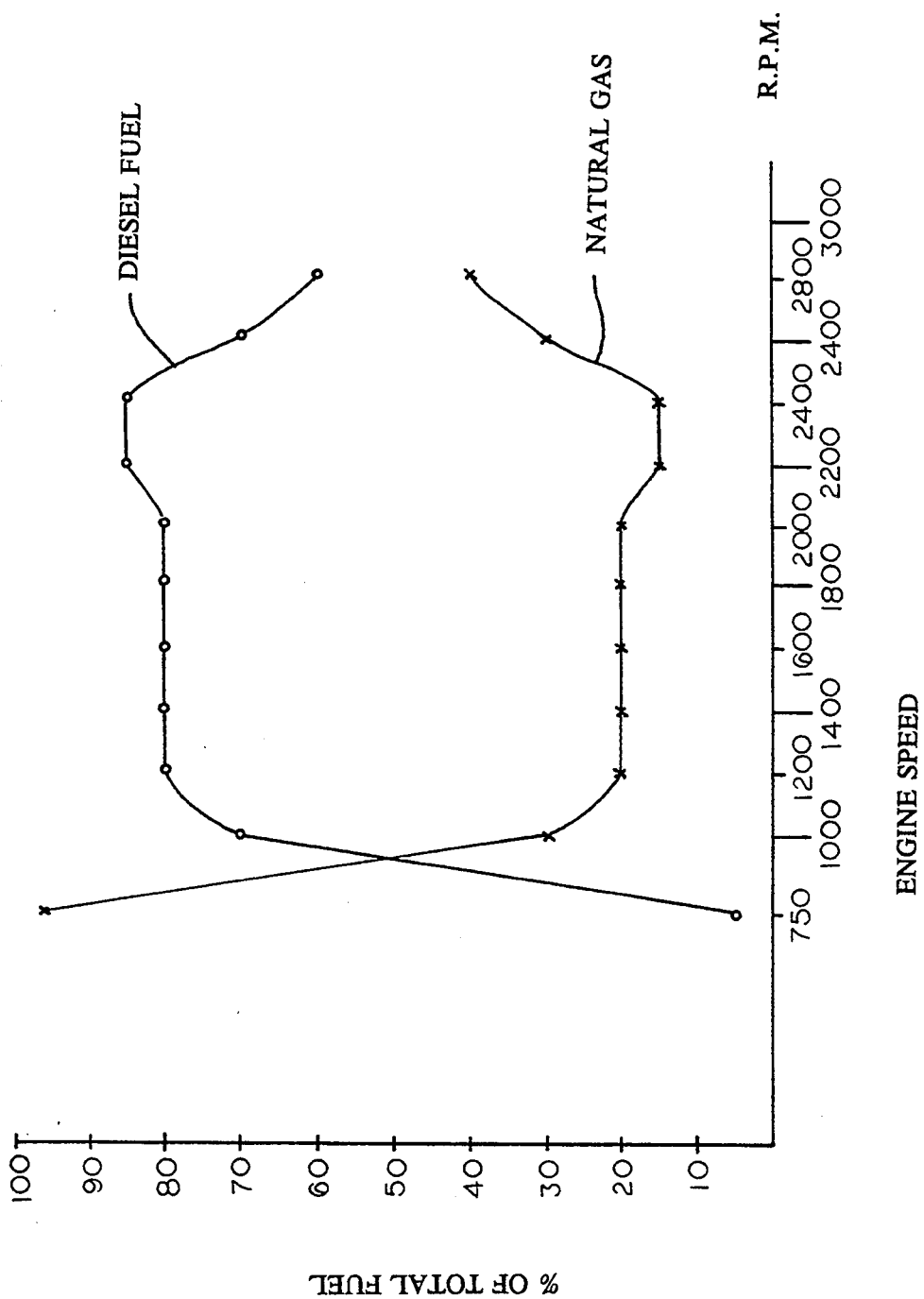
FIG. 3 is a graph showing proportional amounts of fuels dispensed by the system of FIG. 1 at various engine speeds at a constant load.

As shown in FIG. 2, the controller 45 determines the position of actuators 22 and 47 by first comparing the commanded engine speed, which is the sensed position of the accelerator pedal 33 through accelerator sensor 37, to the actual engine speed, which is the sensed engine speed through R.P.M. sensor 40. This comparison is performed continuously and rapidly by the controller to provide optimal efficiency.

If the commanded engine speed is greater than the actual engine speed, i.e. the condition where a load has been placed on the engine, the controller 45 decreases the flow of diesel fuel while increasing the flow of natural gas. The controller decreases the flow of the diesel fuel by actuating the diesel fuel control actuator 47 to its predetermined pilot fuel position stored in the controller memory for that particular engine speed. The position of the actuator 47 is confirmed through feedback line 49. This positioning of the actuator 47 causes the shutoff lever 31 to close thereby restricting the flow of diesel fuel to its minimum acceptable level. The controller increases the flow of natural gas by actuating the fuel metering actuator 22 to a metering position which increases the flow of natural gas therethrough. The metering position of actuator 22 is confirmed through feedback line 58. Should feedback lines 49 and 58 not indicate a confirmed position there is a malfunction in the system to be corrected.

If the commanded engine speed is less than the actual engine speed, i.e. the condition where a load has been removed from the engine, the fuel pump mechanical governor automatically decreases the flow of diesel. However, the diesel fuel must be maintained at least at its pilot fuel level. Therefore, if needed the controller increases the flow of diesel fuel while decreasing the flow of natural gas. The controller increases the flow of the diesel fuel by incrementally actuating the diesel fuel control actuator 47 to a position whereby the shutoff lever 31 is moved so as to allow a greater flow therethrough. The controller decreases the flow of natural gas by incrementally actuating the fuel metering actuator 22 to a metering position which decreases the flow of natural gas therethrough. These incremental movements continue until the commanded engine speed equals the actual engine speed.

FIG. 2 plots the percentage of each fuel used along the entire operational range of a Cummins 4BT engine. At idle the engine speed is very low with only a very small load on it. Therefore, the controller supplies the engine with a large amount of diesel fuel and only a small amount of natural gas. As the engine speed increases an increasing amount of horsepower and torque is required. Therefore, the proportional flow of diesel fuel is reduced while the proportional flow of natural gas is increased. As previously discussed, the exact amount of diesel fuel is determined by the predetermined mapping programmed that has been stored in the controller memory for given engine speeds.

Should the engine overheat the exhaust temperature sensor 41 indicates such a condition to the controller 45. The controller then overrides the mapped setting for the flow of diesel fuel and automatically increases the flow of diesel fuel while simultaneously decreasing the flow of natural gas. This combination of fuel should reduce the engine temperature to below the predetermined setting since the combustion of diesel fuel produces less heat than the combustion of natural gas.

It thus is seen that a dual fuel control system is now provided for use with an internal combustion engine which enhances efficiency. It should be understood, however, that the just described embodiment merely illustrates principles of the invention in its preferred form. Many modifications, additions and deletions may, of course, be made thereto without departure from the spirit and scope of the invention as set forth in the following claims.

I claim:
1. A dual fuel control system for use with an internal combustion engine having a fuel pump having a throttle and a fuel shutoff lever which, in combination, limits the flow of liquid fuel pumped by the fuel pump comprising, in combination,
    liquid fuel metering means for metering the flow of liquid fuel, said liquid fuel metering means including throttle metering means for metering the flow of liquid fuel through actuation of the throttle and shutoff lever metering means for metering the flow of liquid fuel through actuation of the shutoff lever in cooperation with said throttle metering means;
    air/fuel mixer means for mixing gaseous fuel metered to the engine with air;
    gaseous fuel metering means for metering the flow of gaseous fuel to the engine;
    engine speed sensing means for sensing the speed of the engine;
    engine throttle position sensing means for sensing the position of the throttle; and
    control means for controlling said throttle metering means, said shutoff lever metering means and said gaseous fuel metering means in response to comparisons of the sensed engine speeds with sensed throttle positions in accordance with predetermined metering settings for given engine speeds throughout the operable range of engine speeds.

2. The dual fuel control system of claim 1 further comprising engine temperature sensing means for sensing the temperature of the engine, and wherein said control means further controls said throttle metering means, said shutoff lever metering means and said gaseous fuel metering means in response to the sensed engine temperature.

* * * * *